US008365879B2

(12) United States Patent
Schmidt

(10) Patent No.: US 8,365,879 B2
(45) Date of Patent: Feb. 5, 2013

(54) BRAKE ACTUATING DEVICE OF A VEHICLE

(75) Inventor: Roland Schmidt, Stockdorf (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 233 days.

(21) Appl. No.: 12/966,313

(22) Filed: Dec. 13, 2010

(65) Prior Publication Data

US 2011/0079472 A1 Apr. 7, 2011

Related U.S. Application Data

(63) Continuation of application No. PCT/EP2009/005053, filed on Jul. 11, 2009.

(30) Foreign Application Priority Data

Aug. 14, 2008 (DE) .......................... 10 2008 037 923

(51) Int. Cl.
B60T 11/00 (2006.01)
F15B 9/10 (2006.01)

(52) U.S. Cl. ................. 188/152; 188/79.63; 188/196 R; 188/196 V; 188/196 F; 188/344; 91/376 R; 91/389

(58) Field of Classification Search ............... 188/79.63, 188/196 RM, 196 F, 196 V, 153, 344; 74/512–514, 74/560, 567–569, 501 R, 500.5; 91/376 R, 91/389
See application file for complete search history.

(56) References Cited

U.S. PATENT DOCUMENTS 3,988,945 A 11/1976 Fasano
4,424,890 A * 1/1984 Duethman ............... 192/111.12
5,611,249 A * 3/1997 Perisho et al. .................. 74/512
5,868,040 A * 2/1999 Papenhagen et al. ........... 74/513
6,155,385 A 12/2000 Basnett
6,571,660 B2 * 6/2003 Gmurowski et al. ........... 74/512

FOREIGN PATENT DOCUMENTS

DE 698 05 262 T2 11/2002
DE 10 2006 031 012 A1 2/2007
DE 10 2005 036 922 A1 3/2007

(Continued)

OTHER PUBLICATIONS

German Search Report dated Apr. 9, 2009 with partial English translation (nine (9) pages).

(Continued)

Primary Examiner — Bradley King
Assistant Examiner — Mahbubur Rashid
(74) Attorney, Agent, or Firm — Crowell & Moring LLP

(57) ABSTRACT

A brake actuating device has an actuator functionally connected between a piston and a brake pedal lever. The actuator is capable of varying the path length of a force-conducting connection between the brake pedal lever and the piston of the brake cylinder via a displaceable element. A spring element acts on the brake pedal lever. The spring force varies during the variation of the path length such that a sum of the spring force and a force acting on the brake pedal lever from the brake cylinder remains essentially unchanged. The spring element is fastened with one end to the displaceable element and with the other end to the brake pedal lever with the interposition of a tensioning mechanism, which is guided by a cam track provided on the brake pedal lever. The cam track and the spring element are designed such that a displacement of the displaceable element into any possible position of the brake pedal lever does not generate a change in the pedal force at the brake pedal lever that is perceptible to the driver.

8 Claims, 1 Drawing Sheet

FOREIGN PATENT DOCUMENTS

| | | |
|---|---|---|
| EP | 0 126 271 A1 | 11/1984 |
| EP | 1 754 641 A2 | 2/2007 |
| EP | 1 792 799 A2 | 6/2007 |
| FR | 2 268 300 A | 11/1975 |
| JP | 59-29550 A | 2/1984 |
| JP | 2003-127846 A | 5/2003 |

OTHER PUBLICATIONS

International Search Report dated Nov. 10, 2009 with English translation (four (4) pages).

* cited by examiner

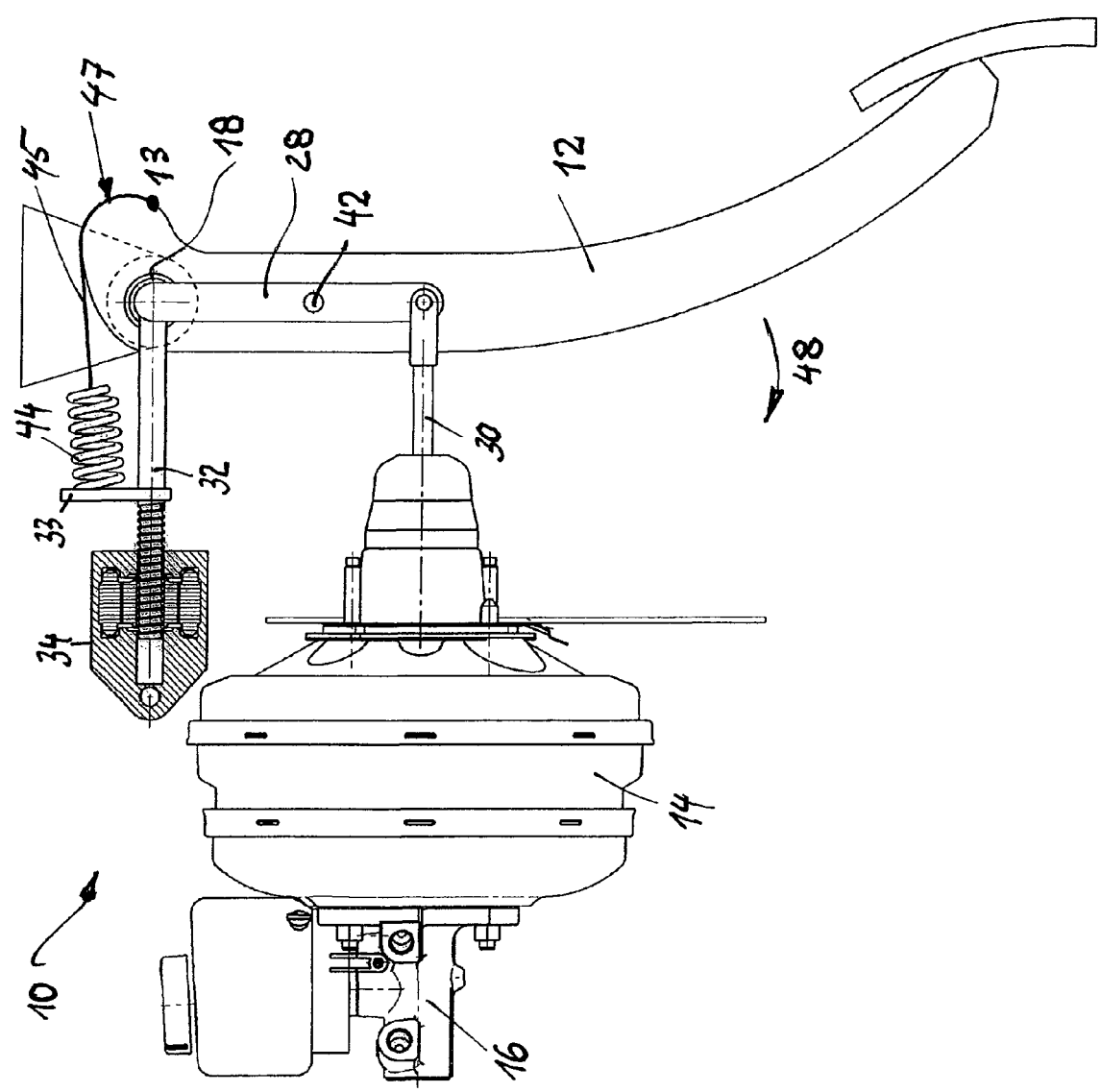

BRAKE ACTUATING DEVICE OF A VEHICLE

CROSS REFERENCE TO RELATED APPLICATIONS

This application is a continuation of PCT International Application No. PCT/EP2009/005053, filed Jul. 11, 2009, which claims priority under 35 U.S.C. §119 from German Patent Application No. DE 10 2008 037 923.9, filed Aug. 14, 2008, the entire disclosures of which are herein expressly incorporated by reference.

BACKGROUND AND SUMMARY OF THE INVENTION

The invention relates to a brake actuating device that is intended for a vehicle and, more particularly, to a brake actuating device for a motor vehicle having a brake pedal lever, which is to be operated by the driver and which is connected in a force-conducting manner to a brake cylinder in order to actuate a piston which is arranged in the brake cylinder. An actuator is functionally connected between the piston and the brake pedal lever. The actuator is capable of varying the path length of the force-conducting connection between the brake pedal lever and the piston of the brake cylinder by way of a displaceable element. Furthermore, a spring element is provided whose spring force, which acts on the brake pedal lever, varies during the variation of the path length of the force-conducting connection between the brake pedal lever and the piston of the brake cylinder by way of the actuator such that the sum of the spring force and the force, which acts on the brake pedal lever from the brake cylinder, remains essentially unchanged. Such a brake actuating device is shown in DE 10 2005 036 922 A1, the specification of which is expressly incorporated by reference herein.

As described in DE 10 2005 036 922 A1, such a brake actuating device is advantageous especially for so-called hybrid vehicles, in which an actuation of the brake pedal lever is supposed to result in the individual case exclusively or partially in a recuperative braking of the vehicle by use of its electric drive motor, whereas the vehicle wheel brakes, which are actuated by the brake cylinder, are not supposed to be actuated at all or only to a limited degree.

FIG. 5 of DE 10 2005 036 922 A1 shows an embodiment with a so-called pedal force/spring force compensation. That is, basically in this embodiment the driver cannot feel at the brake pedal lever each intervention of the actuator, with which, for example, any pressure buildup in the brake cylinder can be prevented when the driver operates the brake pedal lever or with which a pressure buildup in the brake cylinder can be initiated without the driver having to operate the brake pedal lever. In this case the force effect of the brake cylinder, or rather of its piston on the brake pedal lever, is essentially eliminated by the force effect of a suitable compensation spring device, which also acts on the brake pedal lever.

In principle, a brake actuating device having such a pedal force/spring force compensation is advantageous, but the design (FIG. 5) depicted in DE 10 2005 036 922 A1 is relatively complex, for which reason the present invention provides a correspondingly simpler embodiment of such a brake actuating device.

The solution to this problem is characterized in that the spring element is fastened with one end directly or indirectly to the displaceable element and with the other end ultimately to the brake pedal lever with the interposition of a tensioning mechanism, which is guided by a cam track provided on the brake pedal lever. The cam track, which can be pivoted together with the brake pedal lever, and the spring element are designed such that an actuator induced displacement of the displaceable element into essentially any possible position of the brake pedal lever for the purpose of shortening the path length of the force-conducting connection between the brake pedal lever and the piston of the brake cylinder does not generate a change in the pedal force at the brake pedal lever that is perceptible to the driver.

It was recognized that the main application for the known brake actuating lies in the reduction of the path length of the so-called force-conducting connection between the brake pedal lever and the piston of the brake cylinder. That is, in a vehicle, which exhibits, besides the customary hydraulic brake system acting on the vehicle wheels, an additional so-called recuperation brake preferably in the form of an electric generator, it is possible to implement the braking request, specified by the driver of the vehicle with the brake pedal lever, at least proportionally in the recuperation brake by suitably reducing the braking request that is transmitted from the brake pedal lever to the brake cylinder, or rather its piston. Then, the actuator is actuated in a corresponding manner by an electronic control unit, which simultaneously actuates in a corresponding manner the recuperation brake. This is done especially to the effect that the element, which can be displaced by the actuator, reduces the path length of the force-conducting connection between the brake pedal lever and the piston of the brake cylinder to the degree that the braking request, specified by the driver with the brake pedal lever, is implemented in the recuperation brake. However, the invention provides that at the same time the driver shall continue to perceive the customary complete pedal force at the brake pedal lever that he would have also have perceived if his braking request had been completely transmitted to the brake cylinder.

For the application described in the preceding paragraph, the invention provides a brake actuating device that is now designed so as to be significantly simpler than that of the prior art. Instead of the known embodiment with two compensation springs, the present invention requires only one single spring element preferably in the form of a helical tension spring, which is clamped directly between the relevant components—that is, between an element, which is moved by the actuator and which produces the change in the force-conducting connection between the brake pedal lever and the brake cylinder piston, and the brake pedal lever itself.

In order to make it possible for this spring element to be able to compensate for the force, acting on the brake pedal lever from the piston of the brake cylinder, in any possible position of the brake pedal lever, which can be pivoted about a so-called support bearing, which describes a pivot axis, the active lever arm, by which this spring element engages with the brake pedal lever with respect to its pivot axis, is variable. That is, this lever arm is supposed to change in connection with a pivot motion of the brake pedal lever. The latter feature is easy to implement by way of a cam track, which can be pivoted together with the brake pedal lever and on which a tensioning mechanism is guided. This tensioning mechanism connects the end of the spring element that faces away from the moveable element of the actuator to an attachment point on the brake pedal lever. Then, the respective point at which the tensioning mechanism rests against this cam track constitutes the respective support point and, as a result, defines the lever arm with respect to the pivot axis of the brake pedal lever.

An embodiment that is especially advantageous in the above sense because it is compact is produced when the cam track is provided in the region of the support bearing of the brake pedal lever such that, when viewed in the direction of the pivot axis formed by the support bearing and being a part of the brake pedal lever, the tensioning mechanism is guided on the cam track partially around this pivot axis at a distance from the pivot axis. In this case the cam track can be provided on a stand-alone control element or the like, which is connected to the brake pedal lever. However, in an especially simple design the cam track can be incorporated into the brake pedal lever.

Other objects, advantages and novel features of the present invention will become apparent from the following detailed description of one or more preferred embodiments when considered in conjunction with the accompanying drawings.

BRIEF DESCRIPTION OF THE DRAWING

The single FIGURE is a side view of a brake actuating device according to an exemplary embodiment of the invention.

DETAILED DESCRIPTION OF THE DRAWING

For ease of understanding, the fundamental explanations describing the brake actuating device of DE 10 2005 036 922 A1 are not repeated here, but, the embodiment of the present invention described herein uses the same terms and reference numerals as in DE 10 2005 036 922 A1 for the individual components (with the exception of the term of the so-called "compensation spring" used therein).

Referring to the FIGURE, a brake pedal lever 12 of a vehicle is hinged with its—here upper—end to the chassis of the vehicle (not illustrated) by way of a support bearing 18 and, thus, can be pivoted about a pivot axis, which extends perpendicularly to the drawing plane through the support bearing 18. A pedal plate 24 is attached in a conventional manner to the free other end of the brake pedal lever 12. The driver of the vehicle can operate this brake pedal lever 12, which is shown here in an already operated position, by way of the pedal plate 24.

A pin 42, which is set approximately one-third the length of the brake pedal lever 12 away from the support bearing 18, is hinged to the brake pedal lever 12 on the side facing the viewer of the FIGURE. On this side a so-called rocker lever 28 is mounted so that it can pivot about this pin 42. The—here bottom—end of this rocker lever 28 is connected to the free end of the pressure rod 30 of the braking force amplifier 14 and/or the brake cylinder 16, whereas the opposite—here upper—end of this rocker lever 28, which lies here in the region of the support bearing 18, but is connected neither to it nor to the brake pedal lever 12, is connected to the free end of a spindle rod 32 of an actuator 34.

This spindle rod 32 is here the displaceable element of the actuator 34. In this case, the actuator 34 is capable of varying the path length of the force-conducting connection, formed by the pressure rod 30, between the brake pedal lever 12 and the piston of the brake cylinder 16, for which reference is made (once again) to the description in DE 10 2005 036 922 A1. In the exemplary embodiment, an actuator 34 is provided, which acts by way of the spindle rod 32 on the—here upper—end of the rocker lever 28. The rocker lever 28 is fastened by the pin 42 in a pivotal manner on the brake pedal lever 12. The other end of the rocker lever 28 is connected to the pressure rod 30 of the brake cylinder 16 (and/or the piston, which is provided in said brake cylinder). As is clearly evident from the FIGURE, when the actuator 34 induces the displacement of the spindle rod 32 in the horizontal direction, the rocker lever 28 is pivoted about the pin 42, and, thus, the pressure rod 30 is moved to the left or to the right—that is, moved either further into the brake cylinder 16 or preferentially out of the same—that is, in the case of a recuperative braking action.

In the event of a stationary actuator 34, the rocker lever 28 is securely supported by the spindle rod 32, so that the driver can displace in the conventional way the pressure rod 30 of the brake cylinder 16 by use of the brake pedal lever 12. That is, the pressure rod 30 can be displaced into the brake cylinder 16. In so doing, the driver perceives a certain degree of pedal force at the pedal plate 24 that results, inter alia, from the pressure in the brake cylinder 16—modified by the braking force amplifier 14. If, in contrast, the actuator 34 is actuated by an electronic control unit, then when the driver does not operate the brake pedal lever 12, the pressure rod 30 is also displaced in one or the other direction as a function of the direction of displacement of the spindle rod 32. However, the displacement of the spindle rod 32 by the actuator 34, which is suitably actuated by an electronic control unit, should occur by way of the driver in connection with an actuation of the brake pedal lever 12, and especially to the effect that the displacement of the pressure rod 30 by the actuator 34 is the reverse of a displacement of the pressure rod 30 by the brake pedal lever 12 operated by the driver according to the direction of the arrow 48.

For example, the actuator 34 can be actuated simultaneously with an actuation of the brake pedal lever 12 such that it is possible to eliminate and/or compensate for a displacement of the pressure rod 30 that results from the movement of the brake pedal lever 12, so that in the final end the pressure rod 30 does not move at all. For example, it is also possible to actuate the actuator 34—suitably actuated by an electronic control unit—in such a way that the actuation of the brake pedal lever 12 by the driver is converted only proportionally into a displacement of the pressure rod 30 of the brake cylinder 16, whereas the other portion of the braking request, which is specified by the driver with the brake pedal lever 12 and which is actuated by the electronic control unit, is converted into a recuperative braking action, in particular, by the electric drive motor, which is operated as a generator and is part of the vehicle (especially a hybrid vehicle).

In all of the aforesaid cases, that is, in the event of a complete or partial conversion of the braking request specified by the driver with the brake pedal lever 12 by way of the brake cylinder 16, and even when no braking request at all is transmitted to the brake cylinder 16 but rather this braking request is converted completely into a recuperative braking action by an electronic control unit control unit, the driver shall perceive the same customary pedal force at the brake pedal lever 12 (or rather at its pedal plate 24).

In order to generate this pedal force there is a spring element 44, which is fastened with one end directly or indirectly to the spindle rod 32 ("displaceable element") and with the other end is fastened with interposition of a tensioning mechanism 45, which is guided by way of a cam track 47, provided on the brake pedal lever 12, ultimately at an attachment point 13 on the brake pedal lever 12. In the present embodiment, this cam track 47 is incorporated into the end section of the brake pedal lever 12, and in so doing simultaneously surrounds its support bearing 18.

The cam track 47, which can be pivoted together with the brake pedal lever 12 (because it is incorporated into it in the present embodiment) and the spring element 44 are designed such that an actuator 34 induced displacement of the spindle rod 32 into essentially any possible position of the brake pedal lever 12 for the purpose of shortening the path length of the force-conducting connection (by way of the pressure rod 30) between the brake pedal lever 12 and the aforementioned piston of the brake cylinder 16 does not generate a change in the pedal force at the brake pedal lever 12 that is perceptible to the driver.

Since the cam track 47 exhibits almost unlimited design flexibility, it is possible at least for a relatively large displacement path of the actuator 34 to adapt the compensation force, which is introduced into the brake pedal lever 12 by the spring element 44, ideally to a desired pedal force characteristic (=force via the path of the brake pedal lever 12). Any deviations from this defined correlation could result in slight deviations of the compensation force from the desired pedal force characteristic in the case of a linear characteristic of the spring element 44, but this can be compensated, for example, through the use of a spring element having a progressive characteristic. The specific layout of a brake actuating device according to the embodiment now has two influential parameters—that is, besides the spring characteristic of the spring element 44, also the shape of the cam track 47.

Moreover, the cam track can also be provided with a separate cam track disk or control disk, which should be connected in a rotationally rigid manner to the brake pedal lever 12 preferably with respect to the support bearing 18. With respect to the tensioning mechanism 45, it can be a steel ribbon or another suitably flexible tensioning mechanism, such as a chain or cable. In the present embodiment, this tensioning mechanism 45 is guided on the cam track 47 in an arc, which extends over an angle of approximately 90 degrees and is set apart from the support bearing 18, to some extent around the pivot axis, which runs through this support bearing 18 and is a part of the brake pedal lever 12 as far as up to the attachment point 13 on the brake pedal lever 12. With its other end the tensioning mechanism 45 is securely connected to the—here right—end of the spring element 44, which is configured as a helical tension spring and which with its other— here left—end in the present invention is fastened by way of an extension 33, which is provided on the spindle rod 32, and, thus, indirectly to the spindle rod 32.

For the sake of completeness, it must be pointed out once more that in addition to the arrangement of the spring element 44 and the cam track 47 that are presented herein, a comparable additional arrangement of an additional spring element with an additional cam track can be provided in a mirror-symmetrical manner with respect to an axis of symmetry, which runs here perpendicularly through the support bearing 18, and can be fastened on the brake pedal lever 12 and on the spindle rod 32 (which is suitably elongated for this purpose). With this additional arrangement it is then possible to build up through the actuator 34, also in a targeted manner, a brake force in the brake cylinder 16 without the driver having to continue to suitably operate the brake pedal lever 12 and without the driver perceiving a perceptible change in the pedal force at the brake pedal lever 12 as a result. In contrast, the arrangement depicted in the FIGURE allows only a reduction in the braking request, which is generated by the driver with a brake pedal lever 12 and which is transmitted to the brake cylinder 16, without the driver perceiving a perceptible change in the pedal force at the brake pedal lever 12 as a result.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake actuating device for a vehicle, comprising:
  a brake pedal lever operable by a driver and connectable in a force-conducting manner to a brake cylinder to actuate a piston arranged in the brake cylinder;
  an actuator functionally coupleable between the piston and the brake pedal lever;
  a displaceable element being displaceable by the actuator to vary a path length of the force-conducting connection between the brake pedal lever and the piston;
  a spring element having a spring force that acts on the brake pedal lever, the spring force varying as a function of a variation of the path length of the force-conducting connection between the brake pedal lever and the piston such that a sum of the spring force and a brake cylinder force acting on the brake pedal lever remains essentially unchanged;
  a tensioning mechanism;
  a cam track provided on the brake pedal lever;
  wherein one end of the spring element is connected to the displaceable element and the other end is connected to the brake pedal lever via the tensioning mechanism, which the tensioning mechanism is guided by way of the cam track;
  wherein the cam track is pivotable together with the brake pedal lever, the cam track and the spring element being operatively configured such that displacement of the displaceable element by way of the actuator for shortening the path length of the force-conducting connection does not generate a driver perceptible change in pedal force at the brake pedal lever.

2. The brake actuating device according to claim 1, further comprising:
  a support bearing for the brake pedal lever by which the brake pedal lever is mountable on a chassis of the vehicle; and
  wherein the cam track is arranged in a region of the support bearing such that, when viewed in a direction of a pivot axis of the support bearing, the tensioning mechanism is guided on the cam track partially around the pivot axis.

3. The brake actuating device according to claim 1, wherein the cam track is incorporated into the brake pedal lever.

4. The brake actuating device according to claim 2, wherein the cam track is incorporated into the brake pedal lever.

5. The brake actuating device according to claim 1, further comprising:
  a rocker lever fastened in a pivotable manner to the brake pedal lever;
  a spindle rod forming the displaceable element; and
  wherein the actuator acts by way of the spindle rod on one end of the rocker lever, the other end of the rocker lever being connected to a pressure rod of the brake cylinder.

6. The brake actuating device according to claim 2, further comprising:
  a rocker lever fastened in a pivotable manner to the brake pedal lever;
  a spindle rod forming the displaceable element; and
  wherein the actuator acts by way of the spindle rod on one end of the rocker lever, the other end of the rocker lever being connected to a pressure rod of the brake cylinder.

7. The brake actuating device according to claim 3, further comprising:
  a rocker lever fastened in a pivotable manner to the brake pedal lever;
  a spindle rod forming the displaceable element; and wherein the actuator acts by way of the spindle rod on one end of the rocker lever, the other end of the rocker lever being connected to a pressure rod of the brake cylinder.

8. The brake actuating device according to claim 4, further comprising:
a rocker lever fastened in a pivotable manner to the brake pedal lever;
a spindle rod forming the displaceable element; and
wherein the actuator acts by way of the spindle rod on one end of the rocker lever, the other end of the rocker lever being connected to a pressure rod of the brake cylinder.

\* \* \* \* \*